US008380500B2

(12) United States Patent
Yamamoto et al.

(10) Patent No.: US 8,380,500 B2
(45) Date of Patent: Feb. 19, 2013

(54) APPARATUS, METHOD, AND COMPUTER PROGRAM PRODUCT FOR JUDGING SPEECH/NON-SPEECH

(75) Inventors: Koichi Yamamoto, Kanagawa (JP); Masami Akamine, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1182 days.

(21) Appl. No.: 12/234,976

(22) Filed: Sep. 22, 2008

(65) Prior Publication Data

US 2009/0254341 A1 Oct. 8, 2009

(30) Foreign Application Priority Data

Apr. 3, 2008 (JP) ................................ 2008-096715

(51) Int. Cl.
*G10L 15/20* (2006.01)
*G10L 11/06* (2006.01)

(52) U.S. Cl. ...................................... 704/233; 704/210

(58) Field of Classification Search .................. 704/210, 704/215, 233
See application file for complete search history.

(56) References Cited

U.S. PATENT DOCUMENTS

| | | | |
|---|---|---|---|
| 4,239,936 | A | 12/1980 | Sakoe |
| 4,531,228 | A | 7/1985 | Noso et al. |
| 4,829,578 | A | 5/1989 | Roberts |
| 5,201,028 | A | 4/1993 | Theis |
| 5,293,588 | A | 3/1994 | Satoh et al. |
| 5,611,019 | A | 3/1997 | Nakatoh et al. |
| 5,649,055 | A | 7/1997 | Gupta et al. |
| 5,754,681 | A | 5/1998 | Watanabe et al. |
| 5,991,721 | A | 11/1999 | Asano et al. |
| 6,161,087 | A | 12/2000 | Wightman et al. |
| 6,263,309 | B1 | 7/2001 | Nguyen et al. |
| 6,317,710 | B1 | 11/2001 | Huang et al. |
| 6,327,565 | B1 | 12/2001 | Kuhn et al. |
| 6,343,267 | B1 | 1/2002 | Kuhn et al. |
| 6,529,872 | B1 | 3/2003 | Cerisara et al. |
| 6,600,874 | B1 | 7/2003 | Fujita et al. |
| 6,691,091 | B1 | 2/2004 | Cerisara et al. |
| 6,757,652 | B1 | 6/2004 | Lund et al. |

(Continued)

FOREIGN PATENT DOCUMENTS

| | | |
|---|---|---|
| JP | 61-156100 | 7/1986 |
| JP | 62-211699 | 9/1987 |

(Continued)

OTHER PUBLICATIONS

Shen, J. et al., "Robust Entropy-based Endpoint Detection for Speech Rocognition in Noisy Environments", In Proc. ICSLP-98, 4 pages, (1998).

(Continued)

*Primary Examiner* — Angela A Armstrong
(74) *Attorney, Agent, or Firm* — Nixon & Vanderhye, P.C.

(57) ABSTRACT

A spectrum calculating unit calculates, for each of the frames, a spectrum by performing a frequency analysis on an acoustic signal. An estimating unit estimates a noise spectrum. An energy calculating unit calculates an energy characteristic amount. An entropy calculating unit calculates a normalized spectral entropy value. A generating unit generates a characteristic vector based on the energy characteristic amounts and the normalized spectral entropy values that have been calculated for a plurality of frames. A likelihood calculating unit calculates a speech likelihood value of a target frame that corresponds to the characteristic vector. In a case where the speech likelihood value is larger than a threshold value, a judging unit judges that the target frame is a speech frame.

10 Claims, 5 Drawing Sheets

U.S. PATENT DOCUMENTS

| | | | | |
|---|---|---|---|---|
| 7,089,182 | B2 | 8/2006 | Souilmi et al. | |
| 7,236,929 | B2 | 6/2007 | Hodges | |
| 7,634,401 | B2 | 12/2009 | Fukada | |
| 8,099,277 | B2 | 1/2012 | Yamamoto et al. | |
| 2002/0138254 | A1 | 9/2002 | Isaka et al. | |
| 2003/0097261 | A1 * | 5/2003 | Jeon et al. | 704/233 |
| 2004/0064314 | A1 | 4/2004 | Aubert et al. | |
| 2004/0102965 | A1 | 5/2004 | Rapoport | |
| 2004/0204937 | A1 * | 10/2004 | Zhang et al. | 704/233 |
| 2004/0215458 | A1 | 10/2004 | Kobayashi et al. | |
| 2005/0201595 | A1 | 9/2005 | Kamei | |
| 2006/0053003 | A1 | 3/2006 | Suzuki et al. | |
| 2006/0206330 | A1 | 9/2006 | Attwater et al. | |
| 2006/0287859 | A1 | 12/2006 | Hetherington et al. | |
| 2006/0293887 | A1 * | 12/2006 | Zhang et al. | 704/233 |
| 2007/0088548 | A1 | 4/2007 | Yamamoto et al. | |
| 2008/0077400 | A1 | 3/2008 | Yamamoto et al. | |
| 2008/0304750 | A1 | 12/2008 | Kamei | |

FOREIGN PATENT DOCUMENTS

| | | |
|---|---|---|
| JP | 62-237498 | 10/1987 |
| JP | 04-016999 | 1/1992 |
| JP | 04-058297 | 2/1992 |
| JP | 08-106295 | 4/1996 |
| JP | 09-245125 | 9/1997 |
| JP | 10-254476 | 9/1998 |
| JP | 11-052977 | 2/1999 |
| JP | 2000-081893 | 3/2000 |
| JP | 3105465 | 9/2000 |
| JP | 2003-303000 | 10/2003 |
| JP | 2004-192603 | 7/2004 |
| JP | 2004-272201 | 9/2004 |
| JP | 2004-325979 | 11/2004 |
| JP | 2005-031632 | 2/2005 |
| JP | 2007-233148 | 9/2007 |

OTHER PUBLICATIONS

Renevey, P. et al., “Entropy Based Voice Activity Detection in Very Noisy Conditions”, EUROSPEECH, 4 pages, (2001).

Huang, L. et al., “A Novel Approach to Robust Speech Endpoint Detection in Car Environments”, In Proc. ICASSP, pp. 1751-1754, (2000).

Enquing, D. et al., “Applying Support Vector Machines to Voice Activity Detection”, ICSP ’02 PROCEEDINGS, pp. 1124-1127, (2002).

N. Binder et al., “Speech Non-Speech Separation with GMMS”, Proc. Acoustic Society of Japan Fall Meeting, vol. 1, pp. 141-142 (2001).

K. Ishii et al, “Easy-to-Understand Pattern Recognition”, NTT Communication Science Laboratories, Ohmsha, Ltd. (1998).

Yusuke Kida et al.; “Voice Activity Detection based on Optimally Weighted Combination of Multiple Features”; Information Processing Society of Japan; NII—Electronic Library Service; Jul. 15, 2005; pp. 49-54.

Ponceleon et al., Automatic Discovery of Salient Segments in Imperfect Speech Transcripts, Oct. 2001, ACM, 1-58113-436-3/01/0011.

Yamamoto et al., U.S. Appl. No. 11/725,566, filed Mar. 20, 2007.

Yamamoto et al., U.S. Appl. No. 11/582,547, filed Oct. 18, 2006.

* cited by examiner

APPARATUS, METHOD, AND COMPUTER PROGRAM PRODUCT FOR JUDGING SPEECH/NON-SPEECH

CROSS-REFERENCE TO RELATED APPLICATIONS

This application is based upon and claims the benefit of priority from the prior Japanese Patent Application No. 2008-96715, filed on Apr. 3, 2008; the entire contents of which are incorporated herein by reference.

BACKGROUND OF THE INVENTION

1. Field of the Invention

The present invention relates to an apparatus, a method, and a computer program product for judging whether an acoustic signal represents speech or non-speech.

2. Description of the Related Art

In a speech/non-speech judging process performed on an acoustic signal, a characteristic amount is extracted from each of the frames in the input acoustic signal (i.e., an input signal), and a threshold value process is performed on the obtained characteristic amounts, so that it is possible to judge whether each of the frames represents speech or non-speech. J. L. Shen, J. W. Hung, and L. S. Lee, "Robust Entropy-based Endpoint Detection for Speech Recognition in Noisy Environments" in the proceedings of the International Conference on Spoken Language Processing (ICSLP)-98, 1998 has proposed using a spectral entropy value as an acoustic characteristic amount during a speech/non-speech judging process. The characteristic amount is expressed by an entropy value obtained through a calculation in which a spectrum calculated based on an input signal is assumed to be a probability distribution. The value of the spectral entropy is small for a speech spectrum, which has an uneven spectral distribution, whereas the value of the spectral entropy is large for a noise spectrum, which has an even spectral distribution. When the method that employs the spectral entropy value is used, whether each of the frames represents speech or non-speech is judged based on these characteristics.

P. Renevey and A. Drygajlo, "Entropy Based Voice Activity Detection in Very Noisy Conditions" in the proceedings of EUROSPEECH 2001, pp. 1887-1890, September 2001 has proposed a normalization method for improving the efficacy of spectral entropy. According to P. Renevey et al., an input spectrum is normalized by using an estimated noise spectrum. More specifically, in the normalizing process according to P. Renevey et al., the spectrum of the input signal is divided by the spectrum of the background noise so that the value of the spectral entropy in a noise period becomes larger. With this arrangement, it is possible to whiten the spectrum in the noise period and to make the spectral entropy value larger even for uneven background noise such as noise from passing vehicles, which has the energy concentrated in the lower range. It is confirmed that the normalized spectral entropy has high efficacy on stationary noise such as noise from passing vehicles.

However, the normalization of the spectral entropy as described above does not sufficiently normalize, for example, babble noise of which the spectrum changes in a non-stationary manner. As a result, a problem arises where the normalized spectral entropy in the noise period has a small value like that of a speech signal. Because of this problem, when only the normalized spectral entropy is used, it is not possible to achieve high enough efficacy for non-stationary noise.

SUMMARY OF THE INVENTION

According to one aspect of the present invention, a speech judging apparatus includes an obtaining unit configured to obtain an acoustic signal including a noise signal; a dividing unit configured to divide the obtained acoustic signal into units of frames each of which corresponds to a predetermined time length; a spectrum calculating unit configured to calculate, for each of the frames, a spectrum of the acoustic signal by performing a frequency analysis on the acoustic signal; an estimating unit configured to estimate a noise spectrum indicating a spectrum of the noise signal, based on the calculated spectrum of the acoustic signal; an energy calculating unit configured to calculate, for each of the frames, an energy characteristic amount indicating a magnitude of energy of the acoustic signal relative to energy of the noise signal; an entropy calculating unit configured to calculate a normalized spectral entropy value obtained by normalizing, with the estimated noise spectrum, a spectral entropy value indicating a characteristic of a distribution of the spectrum of the acoustic signal; a generating unit configured to generate, for each of the frames, a characteristic vector indicating a characteristic of the acoustic signal, based on the energy characteristic amounts respectively calculated for a plurality of frames including a target frame and a predetermined number of frames that precede and follow the target frame, and based on the normalized spectral entropy values respectively calculated for the plurality of frames; a likelihood calculating unit configured to calculate a speech likelihood value indicating probability of any of the frames of the acoustic signal being the speech frame, based on a discriminative model that has learned in advance the characteristic vector corresponding to a speech frame as a frame of the acoustic signal including speech, and based on the generated characteristic vector; and a judging unit configured to compare the speech likelihood value with a predetermined first threshold value, and judges that the target frame of the acoustic signal is the speech frame when the speech likelihood value is larger than the first threshold value.

DETAILED DESCRIPTION OF THE INVENTION

Figure 1:
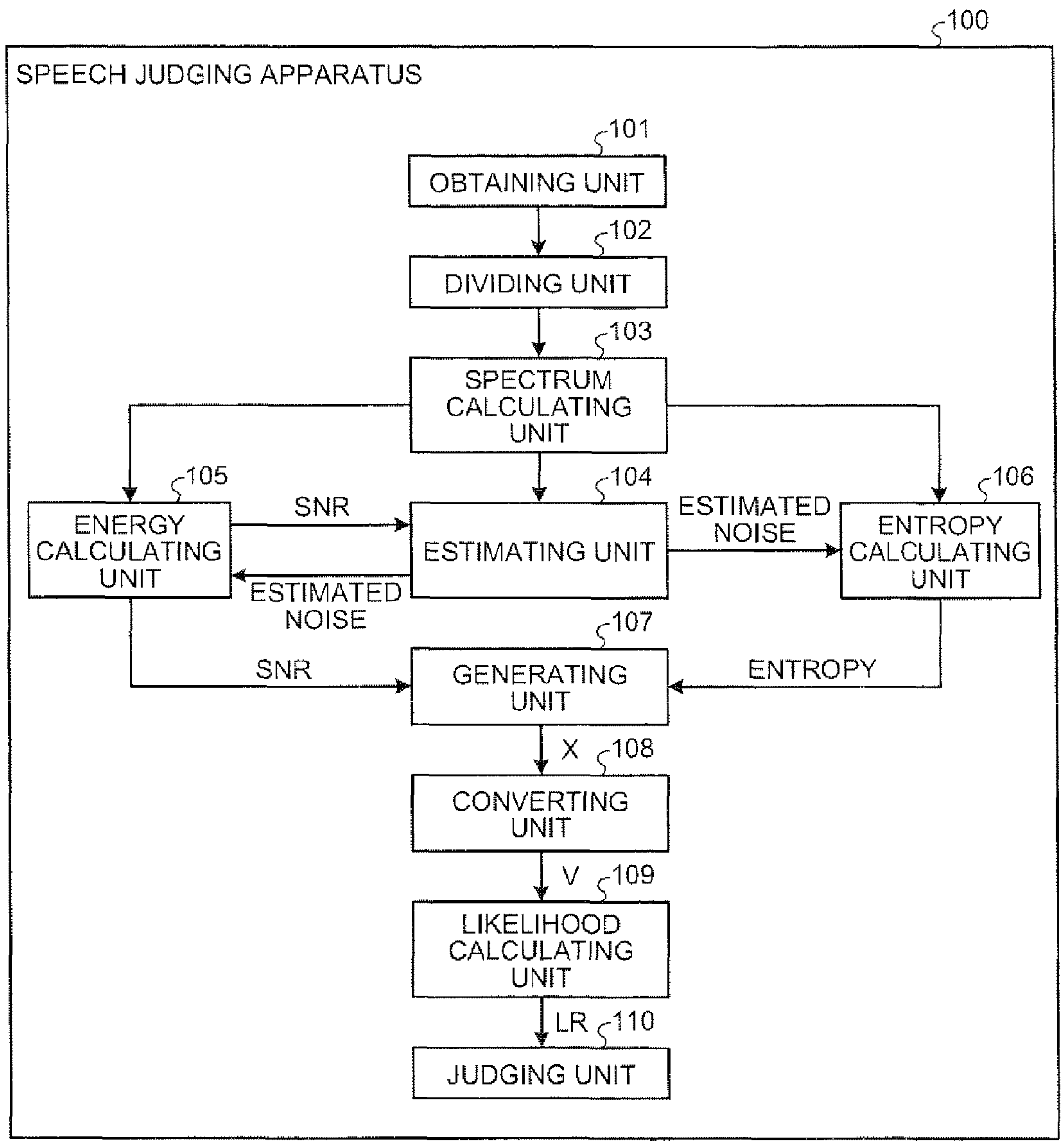
FIG. 1 is a block diagram of a speech judging apparatus according to a first embodiment of the present invention.

Exemplary embodiments of an apparatus, a method, and a computer program product according to the present invention will be explained in detail, with reference to the accompanying drawings. The present invention is not limited to these exemplary embodiments.

A speech judging apparatus according to a first embodiment of the present invention generates a characteristic amount obtained by combining a normalized spectral entropy value as proposed in P. Renevey et al. with an energy characteristic amount that indicates a relative magnitude between an input signal and a noise signal of the background noise (hereinafter, "background noise") and uses the generated characteristic amount to perform a speech/non-speech judging process. Further, the speech judging apparatus according to the first embodiment uses characteristic amounts extracted from a plurality of frames so as to utilize information of a temporal change in a spectrum.

The normalized spectral entropy value according to P. Renevey et al. is a characteristic amount that is dependent on the shape of the spectrum of the input signal. On the other hand, the energy characteristic amount that is used according to the first embodiment of the present invention indicates the relative magnitude between the input signal and the background noise. Thus, the information provided by the characteristic amount according to J. L. Shen et al. and the information provided by the energy characteristic amount according to the present invention are considered to be in a relationship to supplement each other. Also, babble noise is noise in which speech signals of a plurality of persons are superimposed with one another. Thus, when only the information of the spectrum in units of frames is used, it does not seem to be possible to perform the speech/non-speech judging process with high enough efficacy. In view of this problem, it is an object of the first embodiment to improve the efficacy of the speech/non-speech judging process by using information of a dynamic change in the spectrums extracted from a plurality of frames.

L. S. Huang and C. H. Yang "A Novel Approach to Robust Speech Endpoint Detection in Car Environments" in the proceedings of the International Conference on Acoustics, Speech, and Signal Processing (ICASSP) 2000, vol. 3, pp. 1751-1754, June 2000 has proposed detecting the beginning and the end of speech by using a characteristic amount obtained by multiplying a spectral entropy value by energy. However, because the method proposed in L. S. Huang et al. does not use normalized spectral entropy, it does not seem to be possible to achieve a sufficient level of efficacy for a noise period that has an uneven spectral distribution. Also, unlike the method according to the present invention, the method according to L. S. Huang et al. does not use the information from a plurality of frames. Thus, the method according to L. S. Huang et al. does not seem to be able to improve the efficacy by using the information of the dynamic change in the spectrums. Further, the energy used in the method according to L. S. Huang et al. does not take the relative magnitude with respect to the background noise into consideration. Thus, a problem remains where the output characteristic amount changes depending on the adjustments made on the gain of the microphone used to take the signal into the detecting system.

On the other hand, according to the first embodiment, the value that indicates the relative magnitude between the background noise and the input signal is used as the energy characteristic amount. Thus, the value of the characteristic amount does not change depending on the gain of the microphone. In the actual environment where it is not possible to sufficiently adjust the gain of the microphone, it is one of important properties to be independent of the gain of the microphone. In addition, this property is important for another reason: When a speech likelihood value is calculated by using a discriminator that employs, for example, a Gaussian Mixture Model (GMM) like in the first embodiment, this property makes it possible to create a speech/non-speech model without being influenced by an amplitude level of learned data.

As shown in FIG. 1, a speech judging apparatus 100 includes: an obtaining unit 101; a dividing unit 102; a spectrum calculating unit 103; an estimating unit 104; an energy calculating unit 105; an entropy calculating unit 106; a generating unit 107; a converting unit 108; a likelihood calculating unit 109; and a judging unit 110.

The obtaining unit 101 obtains an acoustic signal that includes a noise signal. More specifically, the obtaining unit 101 obtains the acoustic signal by converting an analog signal that has been input thereto through a microphone or the like (not shown) at a predetermined sampling frequency (e.g., 16 kilohertz [kHz]), into a digital signal.

The dividing unit 102 divides the digital signal (i.e., the acoustic signal) that has been output from the obtaining unit 101 into frames each having a predetermined time length. It is preferable to arrange the frame length to be 20 milliseconds to 30 milliseconds and the shift width of the divided frames to be 8 milliseconds to 12 milliseconds. In this situation, as a window function to be used in the frame dividing process, the Hamming window function may be used.

For each of the frames, the spectrum calculating unit 103 calculates a spectrum by performing a frequency analysis on the acoustic signal. For example, the spectrum calculating unit 103 calculates a power spectrum based on the acoustic signal contained in each of the divided frames, by performing a discrete Fourier transform process. Another arrangement is acceptable in which the spectrum calculating unit 103 calculates an amplitude spectrum, instead of the power spectrum.

The estimating unit 104 estimates a power spectrum of the background noise (i.e., a noise spectrum), based on the power spectrum obtained by the spectrum calculating unit 103. For example, the estimating unit 104 estimates initial noise on an assumption that a period of 100 milliseconds to 200 milliseconds from the time at which the acoustic signal starts being taken into the speech judging apparatus 100 represents noise. After that, the estimating unit 104 estimates the noise in each of the following frames by sequentially updating the initial noise according to a Signal to Noise Ratio (SNR) (explained later), which is an energy characteristic amount.

In the case where ten frames from the time at which the acoustic signal starts being taken into the speech judging apparatus 100 are used for estimating the initial noise, it is possible to calculate the initial noise by using Expression (1) below. For the eleventh frame and the frames thereafter, it is possible to sequentially update the noise spectrum by using Expression (2) below.

$$\hat{n}_k(t) = \frac{1}{10}\sum_{t=1}^{10} s_k(t) \tag{1}$$

if $SNR(t) < TH_{snr}$ $$\hat{n}_k(t+1) = \mu \cdot \hat{n}_k(t) + (1-\mu) \tag{2}$$

else $$\hat{n}_k(t+1) = \hat{n}_k(t)$$

$\hat{n}_k(t)$: the power spectrum of the background noise in the k-th frequency band in the t-th frame $s_k(t)$: the power spectrum of the input signal in the k-th frequency band in the t-th frame In the expression above, SNR(t) denotes a Signal to Noise Ratio (SNR) in the t-th frame, while $TH_{snr}$ denotes a threshold value for the SNR used for controlling the update of the noise, and μ denotes a forgetting factor used for controlling the speed of the update. By sequentially updating the noise spectrum in this way, it is possible to improve the level of precision of the SNR and the normalized spectral entropy value even in an environment having non-stationary noise.

The energy calculating unit 105 calculates the SNR as an energy characteristic amount that indicates the magnitude of the energy of the input signal relative to the energy of the noise signal. It is possible to calculate the SNR based on the power spectrum of the input signal and the power spectrum of the background noise by using Expression (3) below.

$$SNR(t) = 10 \cdot \log_{10}\left(\sum_{k=1}^{N} s_k(t) \Big/ \sum_{k=1}^{N} \hat{n}_k(t)\right) \tag{3}$$

The SNR indicates the relative magnitude between the input signal and the background noise. The SNR is a characteristic amount that is based on an assumption that the energy in a speech frame is larger than the energy in a noise frame (i.e., SNR>0). Also, because the SNR indicates the relative magnitude between the two types of energy, the SNR includes information that is not included in the normalized spectral entropy value, which focuses on the shape of the power spectrum. Further, because the SNR has an advantageous feature where the SNR is not dependent on the gain of the microphone used for taking the signal into the speech judging apparatus 100, the SNR is a characteristic amount that is reliable even in an environment where it is difficult to adjust the gain of the microphone in advance.

It is also possible to calculate the SNR by using Expressions (4) to (7) below.

$$SNR(t) = 10 \cdot \log_{10}(E_{in}(t) / E_{noise}) \tag{4}$$

$$E_{noise} = \sum_{i=1}^{initial} u(i)^2 \tag{5}$$

$$E_{in}(t) = \sum_{i=start(t)+1}^{start(t)+frameLength} u(i)^2 \tag{6}$$

$$\text{start}(t) = shiftLength * (t - 1) \tag{7}$$

In the expressions above, $E_{noise}$ denotes the energy of the background noise; $E_{in}(t)$ denotes the energy of the input signal in the t-th frame; u(i) denotes a sample value of the i-th time signal; "initial" denotes the number of samples used for calculating the background noise; "frameLength" denotes the number of samples in the frame width; and "shiftLength" denotes the number of samples in the shift width.

In the method for calculating the SNR by using Expression (4), the energy of the background noise, which is expressed as $E_{noise}$, is calculated based on an assumption that as many samples as "initial" after the time at which the acoustic signal starts being taken into the speech judging apparatus 100 represents a noise period. After that, by comparing $E_{noise}$ with the energy $E_{in}(t)$ calculated from the frames of the input signal, the SNR is extracted. It is preferable to set the number of samples represented by "initial" to correspond to approximately 200 milliseconds (i.e., 3200 samples when being sampled at 16 kilohertz).

The entropy calculating unit 106 calculates the normalized spectral entropy value based on the power spectrum of the background noise and the power spectrum of the input signal by using Expressions (8) to (10) below.

$$\text{entropy}'(t) = -\sum_{k=1}^{N} p'_k(t) \cdot \log p'_k(t) \tag{8}$$

$$p'_k(t) = s'_k(t) \Big/ \sum_{i=1}^{N} s'_i(t) \tag{9}$$

$$s'_i(t) = s_i(t) / \hat{n}_i(t) \tag{10}$$

$\hat{n}_i(t)$: the power spectrum of the background noise in the i-th frequency band in the t-th frame $s_i(t)$: the power spectrum of the input signal in the i-th frequency band in the t-th frame N: the number of frequency bands The spectral entropy value, as proposed in J. L. Shen et al., is calculated by using Expressions (11) and (12) below. The normalized spectral entropy value above corresponds to a value obtained by normalizing the spectral entropy value with the power spectrum of the background noise.

$$\text{entropy}(t) = -\sum_{k=1}^{N} p_k(t) \cdot \log p_k(t) \tag{11}$$

$$p_k(t) = s_k(t) \Big/ \sum_{i=1}^{N} s_i(t) \tag{12}$$

The normalized spectral entropy value is an entropy value obtained through a calculation in which the power spectrum obtained from the input signal is assumed to be a probability distribution. The value of the normalized spectral entropy is small for a speech signal, which has an uneven power spectral distribution, whereas the value of the normalized spectral entropy is large for a noise signal, which has an even power spectral distribution. Also, because the noise spectrum that is based on the background noise is whitened, it is possible to maintain the level of efficacy of the speech/non-speech judging process even for background noise having an uneven distribution. It should be noted that, like the SNR, the normalized spectral entropy value is also a characteristic amount that is not dependent on the gain of the microphone.

The generating unit 107 generates a characteristic vector by using the SNRs and the normalized spectral entropy values that have been calculated for a plurality of frames. First, the generating unit 107 generates a single-frame characteristic amount that includes the SNR and the normalized spectral entropy value that have been calculated for each of the frames, by using Expression (13) below. After that, the generating unit 107 generates a characteristic vector in the t-th frame, which is expressed as x(t), by concatenating together the single-frame characteristic amounts of a predetermined number of frames including the t-th frame and the frames that precede and follow the t-th frame, as shown in Expression (14) below.

$$z(t) = [\text{SNR}(t), \text{entropy}'(t)]^T \tag{13}$$

$$x(t) = [z(t-Z)^T, \ldots, z(t-1)^T, z(t)^T, z(t+1)^T, \ldots, z(t+Z)^T]^T \tag{14}$$

In the expressions above, z(t) denotes the single-frame characteristic amount that includes the SNR and the normalized spectral entropy value in the t-th frame. Z denotes the number of frames to be concatenated together including the t-th frame and the frames that precede and follow the t-th frame. It is desirable to set Z to be around 3 to 5. The characteristic vector x(t) is a vector obtained by concatenating the characteristic amounts of the plurality of frames together and includes information of the temporal change in the spectrum. Thus, the characteristic vector x(t) includes information that is more effective in the speech/non-speech judging process than the information provided in the characteristic amounts extracted from the single frames.

The k-dimensional characteristic vector x(t) that has been generated in the process performed by the generating unit 107 is a characteristic amount that utilizes the information of the plurality of frames. Thus, generally speaking, the characteristic vector x(t) is a characteristic vector that has a higher dimension than each of the single-frame characteristic amounts.

For the purpose of reducing the calculation amount, the converting unit 108 performs a linear conversion process on the k-dimensional characteristic vector x(t) obtained by the generating unit 107, by using a predetermined conversion matrix P. For example, the converting unit 108 converts the characteristic vector x(t) into a j-dimensional characteristic vector y(t) (where $j<k$) by using Expression (15) below.

$$y=Px \tag{15}$$

In the expression above, P denotes a conversion matrix of $j\times k$. It is possible to learn the value of the conversion matrix P in advance by using a method such as a principal component analysis or the Karhunen-Loeve (KL) expansion that is used for the purpose of obtaining the best approximation of a distribution. Another arrangement is acceptable in which the converting unit 108 performs the linear conversion process on the characteristic vector by using a conversion matrix where $k=j$ is satisfied, in other words, by using a conversion matrix in which the dimension does not change. Even if reducing the dimension is not the purpose, performing the linear conversion process makes it possible to allow the elements of the characteristic vector to be uncorrelated to one another and to select a characteristic space that is advantageous for the discriminating process.

Another arrangement is acceptable in which the speech judging apparatus 100 does not include the converting unit 108, but is configured so as to utilize the characteristic vector generated by the generating unit 107 in a likelihood value calculation process, which is explained later.

The likelihood calculating unit 109 calculates a speech likelihood value LR by using the j-dimensional characteristic vector y(t) that has been obtained by the converting unit 108 and a discriminative model used for discriminating between speech and non-speech. The likelihood calculating unit 109 uses the GMM as a model for discriminating between speech and non-speech and calculates the speech likelihood value LR by using Expression (16) below.

$$LR=g(y|\text{speech})-g(y|\text{nonspeech}) \tag{16}$$

In the expression above, g(|speech) denotes a log likelihood value in a speech GMM, whereas g(|nonspeech) denotes a log likelihood value in a non-speech GMM. It is possible to learn the values in the speech GMM and the non-speech GMM in advance, based on a maximum likelihood criterion that uses an Expectation-Maximization (EM) algorithm. In addition, as proposed in JP-A 2007-114413 (KOKAI), it is also possible to learn parameters for a projection matrix P and the GMM in a discriminative manner.

Based on the evaluation value LR indicating the speech likelihood that has been obtained by the likelihood calculating unit 109, the judging unit 110 judges whether each of the frames is a speech frame that includes speech or a non-speech frame that includes no speech, by using Expression (17) below.

$$\text{if } (LR>\theta)\text{speech}$$

$$\text{if } (LR\leqq\theta)\text{nonspeech} \tag{17}$$

In the expression above, θ is a threshold value for speech likelihood. For example, the most appropriate value (e.g., $\theta=0$) for discriminating between speech and non-speech is selected in advance.

Figure 2:
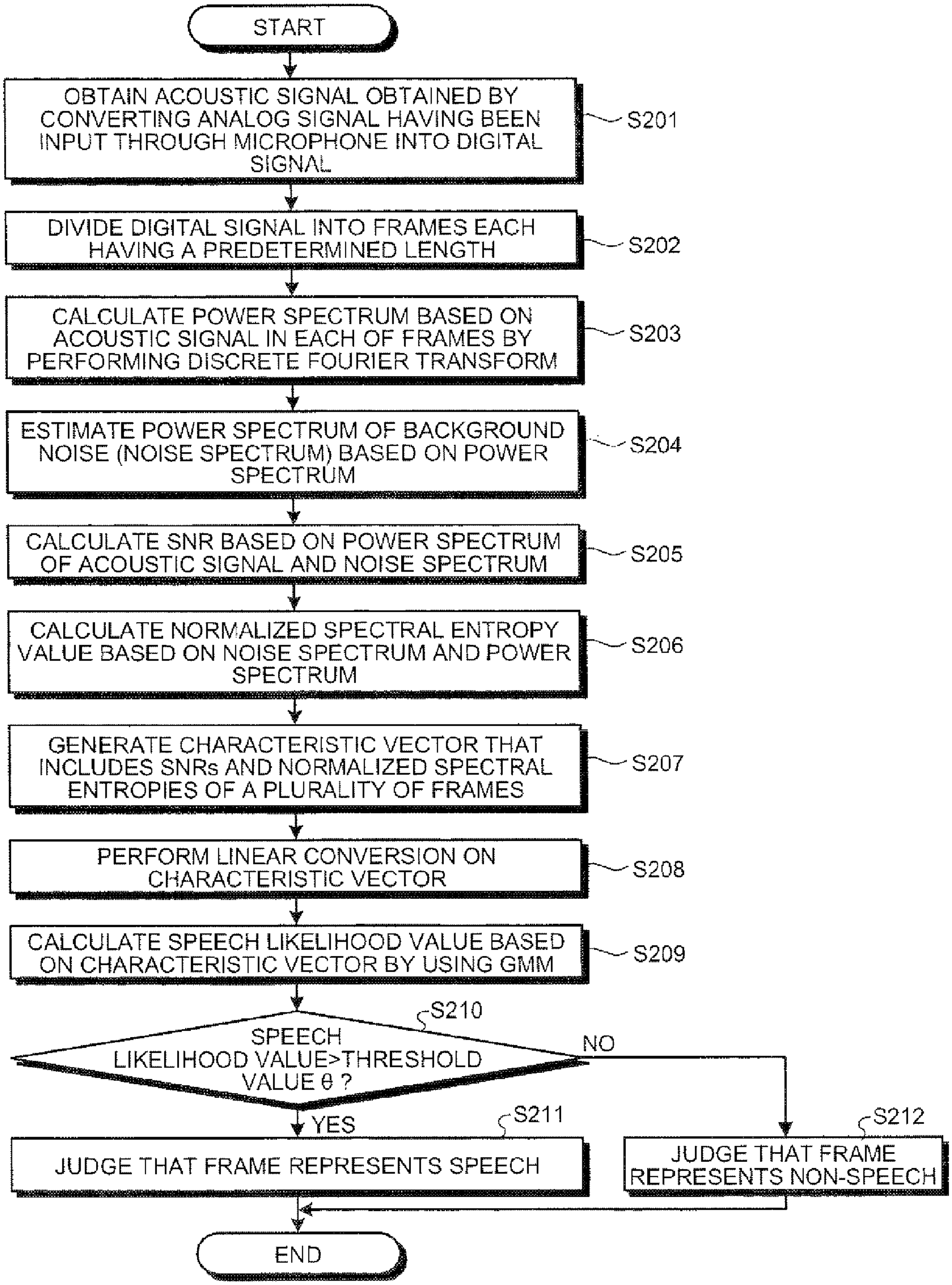
FIG. 2 is a flowchart of an overall procedure in a speech judging process according to the first embodiment.

Next, the speech judging process performed by the speech judging apparatus 100 according to the first embodiment configured as described above will be explained, with reference to FIG. 2.

First, the obtaining unit 101 obtains an acoustic signal obtained by converting an analog signal that has been input thereto through a microphone or the like, into a digital signal (step S201). Subsequently, the dividing unit 102 divides the obtained acoustic signal into units of frames each having a predetermined length (step S202).

After that, for each of the frames, the spectrum calculating unit 103 calculates a power spectrum based on the acoustic signal contained in the frame, by performing a discrete Fourier transform process (step S203). Subsequently, the estimating unit 104 estimates a power spectrum of the background noise (i.e., a noise spectrum) based on the calculated power spectrum, by using one of Expressions (1) and (2) (step S204).

After that, the energy calculating unit 105 calculates an SNR, based on the power spectrum of the acoustic signal and the noise spectrum by using Expression (3) above (step S205). Also, the entropy calculating unit 106 calculates a normalized spectral entropy value based on the noise spectrum and the power spectrum, by using Expressions (8) to (10) (step S206).

After that, the generating unit 107 generates a characteristic vector that includes the SNRs and the normalized spectral entropy values that have been calculated for the plurality of frames (step S207). More specifically, the generating unit 107 generates the characteristic vector as shown in Expression (14) above, by concatenating together single-frame characteristic amounts that are respectively calculated for as many frames as Z by using Expression (13), the Z frames including the t-th frame that is the target of the speech/non-speech judging process and the frames that precede and follow the t-th frame. Subsequently, the converting unit 108 performs a linear conversion process on the characteristic vectors by using Expression (15) (step S208).

After that, the likelihood calculating unit 109 calculates a speech likelihood value LR based on the characteristic vector on which the linear conversion process has been performed, by using Expression (16) and also using the GMM as a discriminative model (step S209). Subsequently, the judging unit 110 judges whether the calculated speech likelihood value LR is larger than a predetermined threshold value θ (step S210).

In the case where the speech likelihood value LR is larger than the threshold value θ (step S210: Yes), the judging unit 110 judges that the frame that corresponds to the calculated characteristic vector is a speech frame (step S211). On the contrary, in the case where the speech likelihood value LR is not larger than the threshold value θ (step S210: No), the judging unit 110 judges that the frame that corresponds to the calculated characteristic vector is a non-speech frame (step S212).

Next, the efficacy of the speech/non-speech judging process according to the first embodiment will be explained. The Equal Error Rate (EER) was 8.22% when a speech/non-speech judging process was performed in units of frames on 5-decibel babble noise by using the method according to the first embodiment. In contrast, the EER was 16.24% when a speech/non-speech judging process was performed under the same conditions, by using the conventional method that employs only the normalized spectral entropy. Consequently, it has been confirmed that the method according to the first embodiment is able to improve the efficacy of the speech/non-speech judging process performed on non-stationary noise such as babble noise, up to a level that is higher than the efficacy achieved by using the method that employs only the normalized spectral entropy as the acoustic characteristic amount.

As explained above, the speech judging apparatus according to the first embodiment generates the characteristic vector by combining the normalized spectral entropy value, which is a characteristic amount that is dependent on the shape of the spectrum of the input signal, with the energy characteristic amount, which is in a supplementary relationship with the normalized spectral entropy and uses the generated characteristic amount in the speech/non-speech judging process. Thus, it is possible to improve the level of precision of the speech/non-speech judging process even for non-stationary noise.

Also, the energy characteristic amount is a value that indicates the relative magnitude between the input signal and the background noise and is not dependent on the gain of the microphone. Consequently, it is possible to improve the efficacy of the speech/non-speech judging process in the actual environment where it is not possible to sufficiently adjust the gain of the microphone. In addition, it is possible to create a speech/non-speech model based on the GMM or the like, without being influenced by the amplitude level of learned data.

Further, according to the first embodiment, the characteristic vector is generated by using the information obtained from the plurality of frames, instead of a single frame. As a result, it is possible to realize a speech/non-speech judging process that utilizes the information of the dynamic change in the spectrums and therefore has high efficacy.

A speech judging apparatus according to a second embodiment of the present invention calculates a delta characteristic amount, which is a dynamic characteristic amount of the spectrum, generates a characteristic vector that includes the delta characteristic amount, and uses the generated characteristic vector in a speech/non-speech judging process.

Figure 3:
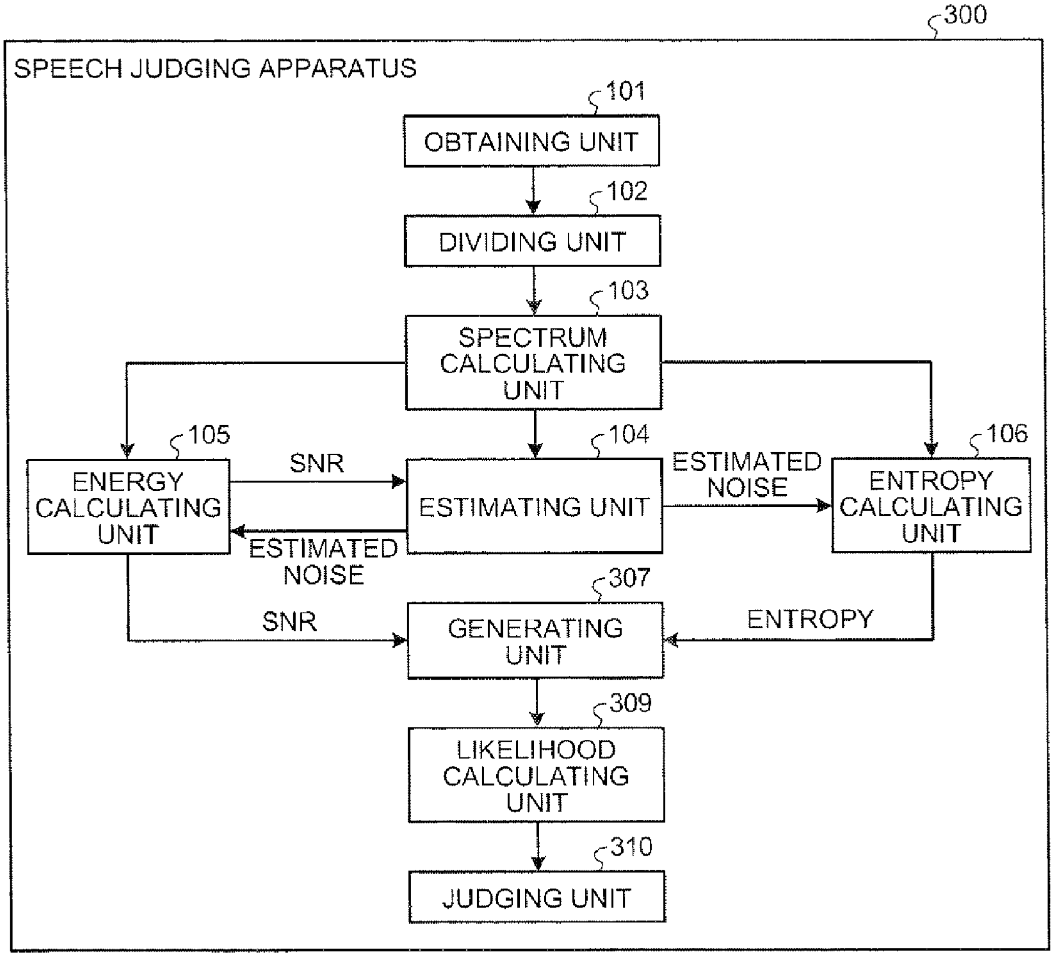
FIG. 3 is a block diagram of a speech judging apparatus according to a second embodiment of the present invention.

As shown in FIG. 3, a speech judging apparatus 300 includes: the obtaining unit 101; the dividing unit 102; the spectrum calculating unit 103; the estimating unit 104; the energy calculating unit 105; the entropy calculating unit 106; a generating unit 307; a likelihood calculating unit 309; and a judging unit 310.

The second embodiment is different from the first embodiment in that the speech judging apparatus 300 does not include the converting unit 108, and the generating unit 307, the likelihood calculating unit 309, and the judging unit 310 have functions that are different from those according to the first embodiment. Other configurations and functions of the second embodiment are the same as those shown in FIG. 1, which is a block diagram of the speech judging apparatus 100 according to the first embodiment. Thus, such configurations and functions will be referred to by using the same reference characters, and the explanation thereof will be omitted.

The generating unit 307 calculates delta characteristic amounts, each of which is a dynamic characteristic amount of the spectrum, based on the SNRs and the normalized spectral entropy values of as many frames as W including the t-th frame and the frames that precede and follow the t-th frame. The generating unit 307 further generates a four-dimensional characteristic vector x(t) by concatenating the calculated delta characteristic amounts with the SNR and the normalized spectral entropy value of the t-th frame, which are static characteristic amounts.

More specifically, the generating unit 307 calculates $\Delta_{snr}(t)$ that represents a delta characteristic amount of the SNR and $\Delta_{entropy'}(t)$ that represents a delta characteristic amount of the normalized spectral entropy value, by using Expressions (18) and (19) below, respectively.

$$\Delta_{snr}(t) = \frac{\sum_{j=-W}^{W} j \cdot SNR(t+j)}{\sum_{j=-W}^{W} j^2} \tag{18}$$

$$\Delta_{entropy'}(t) = \frac{\sum_{j=-W}^{W} j \cdot \text{entropy}'(t+j)}{\sum_{j=-W}^{W} j^2} \tag{19}$$

In the expressions above, W denotes the window width of the frames that are used for calculating the delta characteristic amounts. It is preferable to set W to correspond to three to five frames.

After that, by using Expression (20) below, the generating unit 307 generates the characteristic vector x(t) by concatenating SNR(t) and entropy' (t) each of which is a static characteristic amount of the t-th frame, with $\Delta_{snr}$ (t) and $\Delta_{entropy'}$ (t) that are the dynamic characteristic amounts that have been calculated.

$$x(t)=[\text{SNR}(t),\text{entropy}'(t),\Delta_{snr}(t),\Delta_{entropy'}(t)]^T \tag{20}$$

The characteristic vector x(t) is a vector obtained by concatenating the static characteristic amounts with the dynamic characteristic amounts and is a characteristic amount that uses the information of the temporal change in the spectrum. Thus, the characteristic vector x(t) includes information that is more effective in the speech/non-speech judging process than the information provided in the characteristic amounts extracted from the single frames.

The likelihood calculating unit 309 is different from the corresponding unit according to the first embodiment in that the likelihood calculating unit 309 calculates a speech likelihood value by using a Support Vector Machine (SVM) instead of the GMM. However, another arrangement is acceptable in which the likelihood calculating unit 309 calculates the speech likelihood value by using the GMM, like in the first embodiment.

The SVM is a discriminator that discriminates between two classes. The SVM structures a discriminating boundary so that a margin between a separating hyperplane and learned data is maximized. According to Dong Enqing, Liu Guizhong, Zhou Yatong, and Zhang Xiaodi, "Applying Support Vector Machines to Voice Activity Detection" in the proceedings of the International Conference on Signal Processing (ICSP) 2002, an SVM is used as a discriminator for detecting a speech period. The likelihood calculating unit 309 uses the SVM for performing the speech/non-speech judging process, by using the same method as the one discussed in Dong Enqing et al.

By using an output from the SVM as the speech likelihood value, the judging unit 310 performs the speech/non-speech judging process by using expression (17) above.

Figure 4:
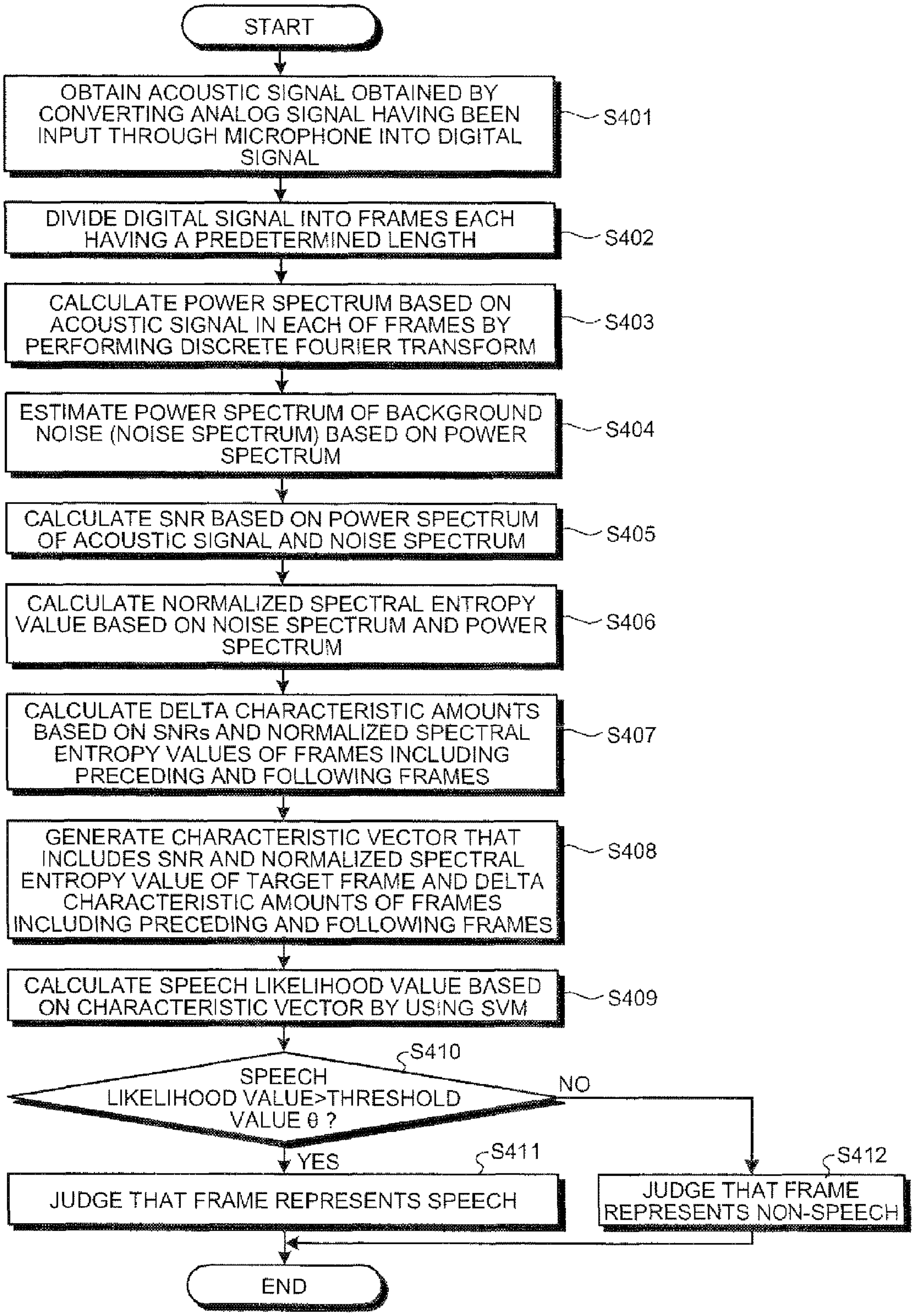
FIG. 4 is a flowchart of an overall procedure in a speech judging process according to the second embodiment.

Next, the speech judging process performed by the speech judging apparatus 300 according to the second embodiment configured as described above will be explained, with reference to FIG. 4.

The acoustic signal obtaining process, the frame dividing process, the spectrum calculating process, the noise estimating process, the SNR calculating process, and the entropy calculating process at steps S401 through S406 are the same as the processes at steps S201 through S206 performed by the speech judging apparatus 100 according to the first embodiment. Thus, the explanation thereof will be omitted.

After the SNRs and the normalized spectral entropy values have been calculated, the generating unit 307 calculates a delta characteristic amount of the SNRs and a delta characteristic amount of the normalized spectral entropy values, based on the SNRs and the normalized spectral entropy values of as many frames as W including the t-th frame and the frames that precede and follow the t-th frame, by using Expressions (18) and (19) above (step S407). Further, the generating unit 307 generates a characteristic vector that includes the SNR and the normalized spectral entropy value of the t-th frame and the two delta characteristic amounts that have been calculated, by using Expression (20) above (step S408).

After that, the likelihood calculating unit 309 calculates a speech likelihood value, based on the generated characteristic vector, by using an SVM as a discriminative model (step S409). Subsequently, the judging unit 310 judges whether the calculated speech likelihood value is larger than the predetermined threshold value θ (step S410).

In the case where the speech likelihood value is larger than the threshold value θ (step S410: Yes), the judging unit 310 judges that the frame that corresponds to the calculated characteristic vector is a speech frame (step S411). On the contrary, in the case where the speech likelihood value is not larger than the threshold value θ (step S410: No), the judging unit 310 judges that the frame that corresponds to the calculated characteristic vector is a non-speech frame (step S412).

As explained above, the speech judging apparatus according to the second embodiment generates the characteristic vector by concatenating the dynamic characteristic amounts in the predetermined window width extending on both sides of the frame used as the target of the speech judging process with the static characteristic amounts of the frame used as the target of the speech judging process and uses the generated characteristic vector to perform the speech/non-speech judging process. Thus, it is possible to realize a speech/non-speech judging process that has higher efficacy than the process that uses the method employing only the static characteristic amounts.

Figure 5:
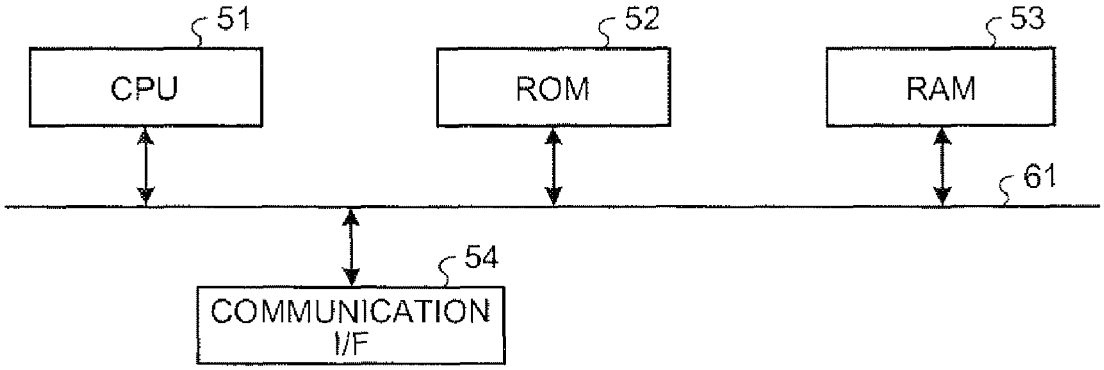
FIG. 5 is a drawing for explaining a hardware configuration of each of the speech judging apparatuses according to the first embodiment and the second embodiment.

Next, a hardware configuration of the speech judging apparatuses according to the first and the second embodiments will be explained, with reference to FIG. 5.

Each of the speech judging apparatuses according to the first and the second embodiment includes: a controlling device such as a Central Processing Unit (CPU) 51; storage devices such as a Read Only Memory (ROM) 52 and a Random Access Memory (RAM) 53; a communication interface (I/F) 54 that establishes a connection to a network and performs communication; external storage devices such as a Hard Disk Drive (HDD) and a Compact Disk (CD) Drive Device; a display device; input devices such as a keyboard and a mouse; and a bus 61 that connects these constituent elements to one another. The speech judging apparatus has a hardware configuration for which a commonly-used computer can be used.

A speech judging computer program (hereinafter, the "speech judging program") that is executed by a speech judging apparatus (e.g., a computer) according to the first or the second embodiment is provided as being stored on a computer readable medium such as a Compact Disk Read-Only Memory (CD-ROM), a flexible disk (FD), a Compact Disk Recordable (CD-R), a Digital Versatile Disk (DVD), or the like, in a file that is in an installable format or in an executable format. The computer readable medium which stores a speech judging program will be provided as a computer program product.

Another arrangement is acceptable in which the speech judging program executed by the speech judging apparatus according to the first or the second embodiment is stored in a computer connected to a network like the Internet, so that the speech judging program is provided as being downloaded via the network. Yet another arrangement is acceptable in which the speech judging program executed by the speech judging apparatus according to the first or the second embodiment is provided or distributed via a network like the Internet.

Further, yet another arrangement is acceptable in which the speech judging program according to the first or the second embodiment is provided as being incorporated in a ROM or the like in advance.

The speech judging program executed by the speech judging apparatus according to the first or the second embodiment has a module configuration that includes the functional units described above (e.g., the obtaining unit, the dividing unit, the spectrum calculating unit, the estimating unit, the SNR calculating unit, the entropy calculating unit, the generating unit, the converting unit, the likelihood calculating unit, and the judging unit). As the actual hardware configuration, these functional units are loaded into a main storage device when the CPU 51 (i.e., the processor) reads and executes the speech judging program from the storage device described above, so that these functional units are generated in the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A speech judging apparatus comprising:

an obtaining unit configured to obtain an acoustic signal including a noise signal;

a dividing unit configured to divide the obtained acoustic signal into units of frames each of which corresponds to a predetermined time length;

a spectrum calculating unit configured to calculate, for each of the frames, a spectrum of the acoustic signal by performing a frequency analysis on the acoustic signal;

an estimating unit configured to estimate a noise spectrum indicating a spectrum of the noise signal, based on the calculated spectrum of the acoustic signal;

an energy calculating unit configured to calculate, for each of the frames, an energy characteristic amount indicating a magnitude of energy of the acoustic signal relative to energy of the noise signal;

an entropy calculating unit configured to calculate a normalized spectral entropy value obtained by normalizing, with the estimated noise spectrum, a spectral entropy value indicating a characteristic of a distribution of the spectrum of the acoustic signal;

a generating unit configured to generate, for each of the frames, a characteristic vector indicating a characteristic of the acoustic signal, based on the energy characteristic amounts respectively calculated for a plurality of frames including a target frame and a predetermined number of frames that precede and follow the target frame, and based on the normalized spectral entropy values respectively calculated for the plurality of frames;

a likelihood calculating unit configured to calculate a speech likelihood value indicating probability of any of the frames of the acoustic signal being a speech frame, based on a discriminative model that has learned in advance the characteristic vector corresponding to a speech frame as a frame of the acoustic signal including speech, and based on the generated characteristic vector;

a judging unit configured to compare the speech likelihood value with a predetermined first threshold value, and judges that the target frame of the acoustic signal is a speech frame when the speech likelihood value is larger than the first threshold value: and a processor for executing computer-executable instructions associated with at least the judging unit.

2. The apparatus according to claim 1, wherein the energy calculating unit calculates, for each of the frames, the energy characteristic amount indicating a magnitude of the spectrum of the acoustic signal relative to the estimated noise spectrum.

3. The apparatus according to claim 1, wherein the generating unit generates, for each of the frames, the characteristic vector that includes, as elements thereof, the energy characteristic amounts respectively calculated for the plurality of frames and the normalized spectral entropy values respectively calculated for the plurality of frames.

4. The apparatus according to claim 1, wherein the generating unit generates, for each of the frames, the characteristic vector that includes, as elements thereof, the energy characteristic amount of the frame, the normalized spectral entropy value of the frame, a dynamic characteristic amount indicating a characteristic of a change in the energy characteristic amount over the plurality of frames, and another dynamic characteristic amount indicating a characteristic of a change in the normalized spectral entropy value over the plurality of frames.

5. The apparatus according to claim 1, wherein the estimating unit compares the calculated energy characteristic amount with a predetermined second threshold value, and when the calculated energy characteristic amount is smaller than the second threshold value, the estimating unit estimates that a value obtained by adding together the calculated spectrum of the acoustic signal and the estimated noise spectrum each of which have been weighted by a predetermined weighting coefficient is the noise spectrum of a frame immediately following the frame for which the energy characteristic amount has been calculated.

6. The apparatus according to claim 1, further comprising a converting unit configured to convert the generated characteristic vectors by using a predetermined conversion matrix, wherein the likelihood calculating unit calculates the speech likelihood value for each of the frames of the acoustic signal, based on the discriminative model and the converted characteristic vectors.

7. The apparatus according to claim 6, wherein the converting unit converts the generated characteristic vectors by using the conversion matrix that converts the characteristic vectors into vectors of a lower dimension.

8. The apparatus according to claim 6, wherein the converting unit converts the generated characteristic vectors by using the conversion matrix that converts the characteristic vectors into vectors of an identical dimension.

9. A speech judging method comprising:

obtaining an acoustic signal including a noise signal;

dividing the obtained acoustic signal into units of frames each of which corresponds to a predetermined time length;

calculating, for each of the frames, a spectrum of the acoustic signal by performing a frequency analysis on the acoustic signal;

estimating a noise spectrum indicating a spectrum of the noise signal, based on the calculated spectrum of the acoustic signal;

calculating, for each of the frames, an energy characteristic amount indicating a magnitude of energy of the acoustic signal relative to energy of the noise signal;

calculating a normalized spectral entropy value obtained by normalizing, with the estimated noise spectrum, a spectral entropy value indicating a characteristic of a distribution of the spectrum of the acoustic signal;

generating, for each of the frames, a characteristic vector indicating a characteristic of the acoustic signal, based on the energy characteristic amounts respectively calculated for a plurality of frames including a target frame and a predetermined number of frames that precede and follow the target frame, and based on the normalized spectral entropy values respectively calculated for the plurality of frames;

calculating a speech likelihood value indicating probability of any of the frames of the acoustic signal being a speech frame, based on a discriminative model that has learned in advance the characteristic vector corresponding to a speech frame as a frame of the acoustic signal including speech, and based on the generated characteristic vector; and comparing the speech likelihood value with a predetermined first threshold value, and judging that the target frame of the acoustic signal is a speech frame when the speech likelihood value is larger than the first threshold value.

10. A computer program product comprising a non-transitory computer readable medium including programmed instructions for judging speech/non-speech, wherein the instructions, when executed by a computer, cause the computer to perform operations comprising:

obtaining an acoustic signal including a noise signal;

dividing the obtained acoustic signal into units of frames each of which corresponds to a predetermined time length;

calculating, for each of the frames, a spectrum of the acoustic signal by performing a frequency analysis on the acoustic signal;

estimating a noise spectrum indicating a spectrum of the noise signal, based on the calculated spectrum of the acoustic signal;

calculating, for each of the frames, an energy characteristic amount indicating a magnitude of energy of the acoustic signal relative to energy of the noise signal;

calculating a normalized spectral entropy value obtained by normalizing, with the estimated noise spectrum, a spectral entropy value indicating a characteristic of a distribution of the spectrum of the acoustic signal;

generating, for each of the frames, a characteristic vector indicating a characteristic of the acoustic signal, based on the energy characteristic amounts respectively calculated for a plurality of frames including a target frame and a predetermined number of frames that precede and follow the target frame, and based on the normalized spectral entropy values respectively calculated for the plurality of frames;

calculating a speech likelihood value indicating probability of any of the frames of the acoustic signal being a speech frame, based on a discriminative model that has learned in advance the characteristic vector corresponding to a speech frame as a frame of the acoustic signal including speech, and based on the generated characteristic vector; and comparing the speech likelihood value with a predetermined first threshold value, and judging that the target frame of the acoustic signal is a speech frame when the speech likelihood value is larger than the first threshold value.

* * * * *